United States Patent [19]

Inayoshi et al.

[11] Patent Number: 4,869,915
[45] Date of Patent: Sep. 26, 1989

[54] WHIPPED OILY FLAVOR

[75] Inventors: Kuniaki Inayoshi, Izumisano; Yoshitsugu Egawa, Wakayama; Yoshinori Hirukawa; Masayuki Yamaguchi, both of Sennan, all of Japan

[73] Assignee: Fuji Oil Company, Limited, Osaka, Japan

[21] Appl. No.: 156,526

[22] Filed: Feb. 16, 1988

[30] Foreign Application Priority Data

Feb. 19, 1987 [JP] Japan .................................. 62-37514

[51] Int. Cl.⁴ ............................................ A23L 1/221
[52] U.S. Cl. .................................... 426/565; 426/613; 426/650; 426/533; 426/582; 426/564
[58] Field of Search ............... 426/564, 572, 650, 533, 426/582, 565

[56] References Cited

U.S. PATENT DOCUMENTS

| | | | |
|---|---|---|---|
| 2,162,585 | 6/1939 | Musher | 426/564 |
| 3,365,305 | 1/1968 | Hunter | 426/564 |
| 3,808,342 | 4/1974 | Brandin | 426/565 |
| 4,450,182 | 5/1984 | Stahl et al. | 426/565 |
| 4,451,492 | 5/1984 | Dell et al. | 426/564 |
| 4,525,372 | 6/1985 | Giddey et al. | 426/564 |

Primary Examiner—Jeanette Hunter
Attorney, Agent, or Firm—Wenderoth, Lind & Ponack

[57] ABSTRACT

A whipped oily flavor comprising oil-in-water or water-in-oil-in-water cream base in a whipped state which contains a spice, and a non-sweet or low-sweet saccharide and is packed in a container in a frozen state.

3 Claims, 2 Drawing Sheets

U.S. Patent Sep. 26, 1989 Sheet 1 of 2 4,869,915
FIG. 1
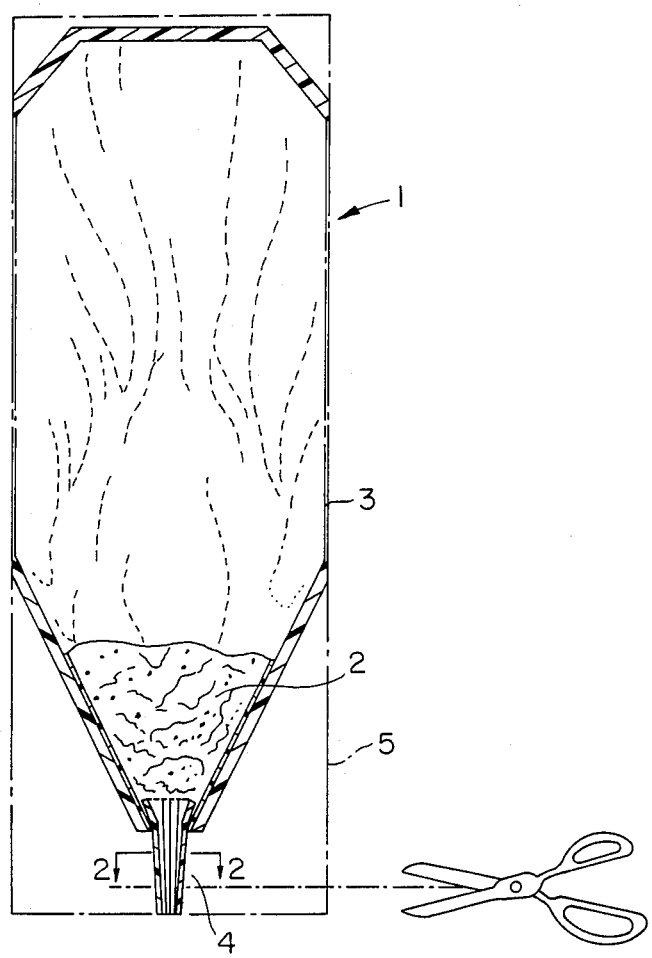
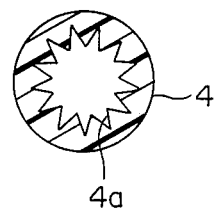
FIG. 2

WHIPPED OILY FLAVOR

FIELD OF THE INVENTION

The present invention relates to a novel whipped oily flavor having light mouth feel.

BACKGROUND OF THE INVENTION

Hitherto, only a few kind of flavors such as mayonnaise, dressing, tabasco, chinese red pepper oil and the like have been known. Among them, mayonnaise has been relatively widely used, but its use is mainly limited to cold dishes made from materials such as vegetable, egg, shrimp, crab and the like; and, in the case of warm dishes, it is limited to sauce for Japanese pan-cake.

Japanese Patent Kokai No. 61-289859 discloses utilization of hot taste of horseradish for flavoring of mayonnaise. However, the product obtained is far from a conventional mayonnaise because it contains a large amount of oil, e.g. 40 to 80%.

On the other hand, there have been known oily flavors such as whipped cream containing vanilla, strawberry, yogurt, chocolate, bitter and the like. However, taste thereof is mainly composed of a milk flavor and is suitable for cake and the like.

OBJECTS OF THE INVENTION

The main object of the present invention is to provide a novel whipped oily flavor having suitable hot taste and plasticity which is rather different from a conventional mayonnaise or whipped cream, but is applicable for various kinds of food in the same sense of using a conventional butter or margarine.

This object as well as other objects and advantages of the present invention will become apparent to those skilled in the art from the following description with reference to the accompanying drawings.

BRIEF EXPLANATION OF DRAWINGS

FIG. 1 is a front view showing partial section of a squeezing bag in which one embodiment of the whipped oily flavor of the present invention is filled as described in Example 1 hereinafter.

FIG. 2 is a cross section taken along the line X—X of the nozzle in FIG. 1.

SUMMARY OF THE INVENTION

Figure 3:
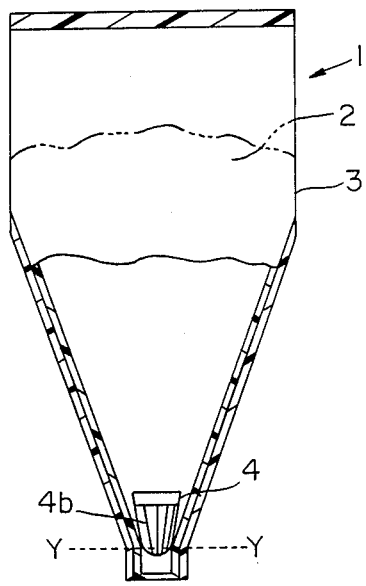
FIG. 3 is a front view showing a partial section of another embodiment of a bag.

According to the present invention, there is provided a whipped oily flavor comprising oil-in-water or water-in-oil-in-water cream base in a whipped state which contains a spice, and a non-sweet or low-sweet saccharide and is packed in a container in a frozen state.

DETAILED DESCRIPTION OF THE INVENTION

The cream base used herein is the same as that of a conventional whipped cream and a double emulsificated type whipped cream wherein oil, protein and water are whipped by using a suitable emulsifier to form oil-in-water or water-in-oil-in-water type cream. As the oil, it is preferred to use oil which is solid or semi-solid at room temperature, for example, palm oil mid-fraction, coconut oil or palm kernel oil, or hydrogenated oil thereof, or a hydrogenated rapeseed oil or hydrogenated soybean oil in order to obtain a good shape retention. To provide light mouth feel to the final product, oil contained in the cream base is preferably in the range of 5 to 35% by weight, more preferably about 20 to 35% by weight, which is lower than that of conventional whipping cream (about 45% by weight).

Examples of the emulsifier include any substance accepted by the Food Sanitation Act such as sorbitan fatty acid ester, polyglycerol fatty acid ester, sucrose fatty acid ester, propyleneglycol fatty acid ester, fatty acid monoglyceride, lecithin and the like. Generally, a good result can be obtained by using a combination of lipophilic and hydrophilic emulsifiers. Particularly, in the case of using water-in-oil-in-water cream base which contains less oil, it is preferred to use a emulsifier such as polyglycerol ricinoleic acid ester, sucrose erucid acid ester or the like.

Protein is necessary to stabilize a emusified state. However, it is preferred to use protein having slight or no milk flavor such as refined casein or vegetable seed protein because crude milk protein provides milk flavor to the final product an adversely affects on a balance of flavor. In the case of using crude milk protein such as skim milk powder, it is preferred to use less amount than that of conventional whipped cream.

The non-sweet or low-sweet saccharide is added to provide a freeze resistance to the final product. In the present invention, slight sweetness is useful for enhancing hot taste of the product, but the excessive sweetness adversely affects on a balance of taste thereof. Therefore, the saccharide must be non-sweet or low-sweet since it is used providing freeze resistance to the final product. Examples of suitable saccharides to be used include low-sweet sugars without odd tastes such as bitter taste, for example, monosaccharides such as D-glucose and D-galactose, disaccharide such as maltose, cellobiose, trehalose isomaltose, lactose and melibiose, oligosaccharides such as raffinose, gentianose, maltotricose and stachyose, and starch hydrolysate such as reducing saccharified starch, dextrin and dextran. The amount of the non-sweet or low-sweet saccharide to be added is preferably not less than 7% by weight based on the total composition as dry solids.

In the present invention, various kinds of spices can be used as the essential constituent. Most suitable spice is mustard, but there can be used other spices such as allspice, bay leaf, cardamon, cassia, cayenne, pepper, cinnamon, celery seed, clove, coriander, cumin, curcuma, dill seed, ginger, horseradish, mace, marjoram, nutmeg, pepper, saffron, sage, savory, thyme, turmeric red pepper, chinese pepper, perilla frutescens crispa, polygonum, wasabia japonica matsum, zingiber mioga, dried orange peel, shichimi-spice and the like. The amount of the spice to be added is normally less than 1% by weight based on the total composition, but a larger amount of the spice may be added depending on the kind thereof and desired taste.

The composition of the present invention may include other various kinds of seasoning materials in addition to the above and, thereby, the resulting composition will have more spicy and harmonious taste. Further, suitable color can be provided to the product (composition) depending on the kind of the seasoning materials. For example, tomato ketchup and other sauces, seaweed, vinegar, beef extract, chichen extract, liquor, wine, sweet rice wine, salt, curry powder and the like may be used as the seasoning materials, but not limited to these materials.

Generally, the composition of the present invention can be prepared by the steps of emulsifying all starting materials, sterilizing and whipping the resulting emulsion, filling it in a suitable container, and finally freezing it. One embodiment of the typical preparation is as shown in the following scheme, but various changes can be made according to common sense in the art.

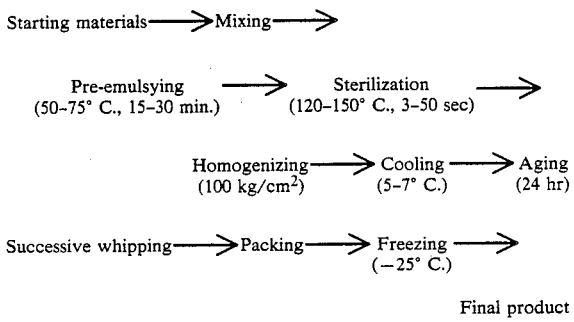

As the container, it is preferred to use a squeezing bag of a flexible material having a nozzle.

One embodiment of a squeezing bag is shown in FIGS. 1 and 2.

That is, the final product 1 of the present invention is the whipped oily flavor 2 packed in the squeezing bag 3. The squeezing bag has the nozzle 4 at the mouth part thereof. The nozzle 4 has serrated grooves 4a. The bag 3 is packed in a cellophane bag 5. When it is used, the bag is cut as shown in FIG. 1 and the whipped oily flavor is squeezed out.

Figure 4:
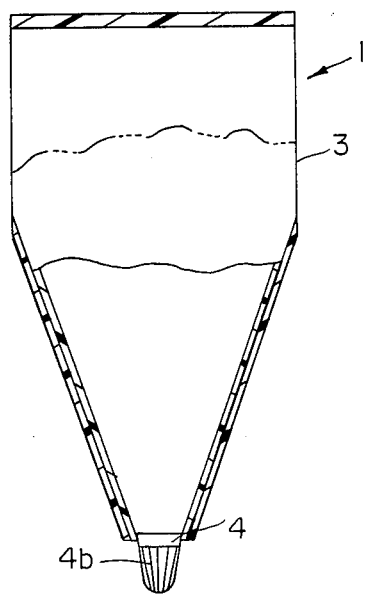
FIG. 4 is a front view illustrating use of the bag of FIG. 3.

Another embodiment of a squeezing bag is whon in FIGS. 3 and 4.

The bag shown in FIG. 3 is substantially the same as that of FIG. 1 but the truncated pyramidal nozzle 4 is contained in the bag 3 before use and has pleats 4b on the outer wall thereof. When it is used, the bag is cut along the line Y—Y and is pressed. Thereby, the nozzle is come out of the bag as squeeze out of the flavor 2.

The product of the present invention is a novel, light type flavor suitable for everybody having a good melt property within the mouth like whipped cream and light mouth feel. Further, this product has still a suitable plasticity after thawing. Therefore, the product of the present invention can be used instead of or together with a conventional mayonnaise, ketchup, butter, margarine and can be used according to various manners as follows.

(1) Interesting and fashionable letter, symbol and figure can be formed by using the product of the present invention because of its decoration property. This property is useful for decorating dishes served at a birthday party, wedding reception and a party in a hotel or a restaurant.

(2) The product can be used in various ways such as sandwiching, filling and icing.

(3) The product has wide uses such as topping for vegetable salad, ham and sausage; and filling or spread for daily dishes and bread.

(4) Taste of the product are varied freely depending on choice of spice or seasoning materials.

(5) In case of using the product, a user has only to squeeze it because the product has been whipped and, therefore, the workability is good.

(6) A novel soup can be obtained by squeezing it out on liquid such as soup.

The following Example further illustrate the present invention in detail, but are not to be construed to limit the scope thereof.

EXAMPLES 1-5

According to the formulations below, five kinds of oily flavors were prepared according to the above general method, and then the flavors were filled in the squeezing bag as shown in FIGS. 1 and 2.

The resulting product had a over-run of about 100% and had a good taste based on mustard flavor or cheese flavor as a main flavor and additional salty taste, nutmeg taste, ketchup taste, beef taste or sour taste.

In the case of using the bag the nozzle (4) was cut to a suitable length with a scissors.

[Formulations]

| Ingredients | Example No. (Parts by weight) | | | | |
|---|---|---|---|---|---|
| | 1 | 2 | 3 | 4 | 5 |
| Hydrogenated coconut oil | 9 | 9 | 9 | 9 | 9 |
| Hydrogenated palm kernel oil | 11.5 | 11.5 | 11.5 | 11.5 | 11.5 |
| Palm kernel oil | 7.5 | 7.5 | 7.5 | 7.5 | 7.5 |
| Skim milk powder | 4 | 4 | 4 | 4 | 4 |
| Cheese powder | 4.7 | 4.7 | 4.7 | — | 2 |
| Reducing starch sugar | 10 | 10 | 10 | 10 | 10 |
| Lecithin | 0.3 | 0.3 | 0.3 | 0.3 | 0.3 |
| Sucrose fatty acid ester (HLB7) | 0.2 | 0.2 | 0.2 | 0.2 | 0.2 |
| Sorbitan fatty acid ester | 0.04 | 0.04 | 0.04 | 0.04 | 0.04 |
| Xanthanegum | 0.1 | 0.1 | 0.1 | 0.1 | 0.1 |
| Hexameta sodium phosphate | 0.3 | 0.3 | 0.3 | 0.3 | 0.3 |
| Sodium hydrogencarbonate | 0.02 | 0.02 | 0.02 | 0.02 | 0.02 |
| Dyestuff | 0.02 | 0.02 | 0.02 | 0.02 | 0.02 |
| Mustard | 0.2 | 0.2 | 0.2 | 0.2 | 0.2 |
| Red pepper flavor | 0.04 | 0.04 | 0.04 | 0.04 | 0.04 |
| Mustard flavor | 0.05 | 0.05 | 0.05 | 0.05 | 0.05 |
| Salt | 0.2 | — | — | — | — |
| White pepper | — | 0.5 | — | — | — |
| Nutmeg | — | 0.15 | — | — | — |
| Red wine | — | 2 | — | — | 2 |
| Ketchup | — | — | 5 | — | — |
| Beef powder | — | — | — | 2 | — |
| Vinegar | — | — | — | — | 2 |
| Water | up to 100 parts | | | | |
| Total (parts) | 100 | 100 | 100 | 100 | 100 |

What is claimed is:

1. A whipped oil-in-water or water-in-oil-in-water cream base which comprises 5 to 35% by weight of oil, a spice, and a saccharide from the group consisting of cellobiose, trehalose, isomaltose, melibiose, raffinose, gentianose, maltotricose, stachyose, reducing saccharified starch, dextran or combinations thereof in an amount sufficient to provide said base with freeze resistance, said base having a over-run of about 100% and being packed in a container in a frozen state.

2. The flavor according to claim 1, wherein the spice is mustard.

3. The flavor according to claim 1, wherein cheese is included as a seasoning.

* * * * *